| United States Patent [19] | [11] Patent Number: 4,895,207 |
| Friedman et al. | [45] Date of Patent: Jan. 23, 1990 |

[54] METHOD AND FLUID FOR PLACING RESIN COATED GRAVEL OR SAND IN A PRODUCING OIL WELL

[75] Inventors: Robert H. Friedman; Billy W. Surles, both of Houston, Tex.

[73] Assignee: Texaco, Inc., White Plains, N.Y.

[21] Appl. No.: 285,996

[22] Filed: Dec. 19, 1988

[51] Int. Cl.$^4$ ............................................. E21B 43/04
[52] U.S. Cl. .................................... 166/276; 166/295; 166/300
[58] Field of Search ............... 166/276, 278, 280, 295, 166/300; 523/131

[56] References Cited

U.S. PATENT DOCUMENTS

| 4,042,032 | 8/1977 | Anderson et al. | 166/295 X |
| 4,127,173 | 11/1978 | Watkins et al. | 166/276 |
| 4,427,069 | 1/1984 | Friedman | 166/295 |
| 4,428,427 | 1/1984 | Friedman | 166/295 X |
| 4,512,407 | 4/1985 | Friedman | 166/300 X |
| 4,669,543 | 6/1987 | Young | 166/295 X |
| 4,800,960 | 1/1989 | Friedman et al. | 166/276 |

*Primary Examiner*—George A. Suchfield
*Attorney, Agent, or Firm*—Jack H. Park; Kenneth R. Priem

[57] ABSTRACT

Disclosed are fluid and method for suspending resin coated sand in order to place the sand adjacent to a production well for the purpose of forming a permeable consolidated gravel pack. The fluid contains a viscosifying amount of hydroxyethylcellulose, sufficient fluorescent dye to increase the viscosity of the fluid, sodium chloride, and an acid forming component such as phthalic anhydride or succinic anhydride. As fluid containing the resin coated gravel particles is pumped down the injection string and positioned where it is desired to form the consolidated gravel pack, the acid forming material slowly reacts with water to form an acid, reducing the pH of the fluid, and thereby reducing the viscosity of the carrier fluid which facilitates the resin coated sand grains coming together in order to form the desired gravel pack.

9 Claims, No Drawings

METHOD AND FLUID FOR PLACING RESIN COATED GRAVEL OR SAND IN A PRODUCING OIL WELL

FIELD OF THE INVENTION

This invention relates to a novel fluid and a method using the fluid for suspending gravel or sand which is coated with a resin during the time it is formulated on the surface of the earth and injected into and transported down on an injection string in a producing wellbore for placing adjacent to the perforations. The improved carrier fluid exhibits sufficient viscosity to assist in suspending the resin coated sand grains and to prevent abrasive removal of the resin from the sand grains during the time the resin coated sand grains are mixed in the carrier fluid and pumped down an injection string into the site where consolidation of the coated sand grains is to be accomplished. The fluid includes a trigger mechanism which causes the viscosity of the suspending fluid to be reduced after the period of time required to locate the sand grains where they are to be consolidated in the production interval.

BACKGROUND OF THE INVENTION

One of the problems frequently encountered during the course of producing petroleum and other fluids from subterranean formations is the inadvertent flow of sand or other mineral particles from the petroleum formation along with the formation fluid being recovered from the producing well. This is a well recognized problem and many undesirable consequences result from this phenomena. The flow of sand into the wellbore causes the creation of a cavity or zone of greatly weakened formation around the perforation of the wellbore, which in severe instances will cause the formation to collapse and destroy the casing and cause loss of the production well. Also, continued production of fluid with simultaneous flow of sand or other abrasive mineral particles will cause the wellbore itself to become plugged which reduces the rate of production of oil from the well and in severe instances will completely terminate further production. Finally, the sand being produced and transported to the surface of the earth along with formation fluids causes abrasive wear of tubular goods and pumps utilized in producing wells, which cause early failure of these expensive components.

The above described problems have long been recognized and many procedures have been disclosed in the prior art for forming barriers to the flow of consolidated sand from formations during the production of formation fluids. Most of these procedures have the common feature of forming a stable permeable zone around the production well which permits fluids to flow freely through the barrier, while restraining the flow of particulate matter such as sand or other particles. One particularly successful technique is referred to in the art as gravel packing, and it utilizes granular materials such as sand or gravel which is placed in a cavity or washed out zone adjacent to the production perforations of a producing well. The gravel placed in the well is restrained from itself moving along with the formation fluids either by a mechanical screen or by cementing the sand grains together using a polymerizable resin to form a solid permeable mass to completely fill the washed out zone in order to form the sand restraining, fluid permeable barrier around the production well.

The use of thermal stimulation techniques has imposed even more severe requirements on sand control techniques utilized in wells completed in oil fields being stimulated by thermal means, e.g. by injection of steam or other hot aqueous fluids into the formation, because the passage of the hot aqueous and frequent by alkaline fluids through the resin-consolidated sand mass causes rapid destruction of many resin matrices used to bind the sand or gravel particles together.

U.S. Pat. Nos. 4,427,069 and 4,428,427 introduced the concept of employing a durable resin formed by polymerizing furfuryl alcohol oligomer on the sand grains for the purpose of forming a stable consolidated sand mass for purposes of controlling sand flow into the producing well. In my pending application Ser. No. 07/135,162 filed Dec. 18, 1987, for "Consolidatable Gravel Pack Method," there is disclosed a method for suspending resin coated gravel or sand in an aqueous saline carrier fluid to prevent the unpolymerized resin coated particles from sticking together during the time they are being transported into the formation in order to form a consolidated gravel pack sand control barrier in the formation adjacent to a producing well. In this application, it was noted that during the time the resin coated sand particles are transported into the zone where the permeable mass is to be formed, abrasive removal of the resin from the sand particles is prevented by incorporation in the carrier fluid of a viscosifying amount of a hydrophilic polymers such as hydroxyethylcellulose.

In applying the above feature, it has been found that the resin coated sand particles can indeed be transported from the mixing means on the surface of the earth via a tubing located in a producing well and placed where they are desired in a cavity or zone adjacent to the producing perforations in an oil well, without removal of a significant portion of the resin coating on the sand particles during the time of mixing and transportation. The viscosity of the carrier fluid becomes a hindrance once the fluid comprising the carrier fluid and the resin coated particles has been located in the well, in that it delays or restricts the proper packing of the resin coated particles in the producing well necessary for subsequent polymerization to produce the desired strong, durable, permeable sand controlling zone.

In view of the foregoing discussion, it can be appreciated that there is a substantial, unfulfilled commercial need for a technique for suspending resin coated gravel or sand particles during the time they are mixed and transported via an injection string in a production well to the zone where it is desired to form a consolidated permeable gravel pack for the purpose of restraining the undesired flow of sand, while later allowing the resin-coated gravel or sand particles to pack closely together in a manner which enhances the formation of a dense, durable, strong permeable consolidated mass such as is necessary to control sand migration during production operations. Ideally, what is needed is a fluid which exhibits sufficient viscosity to prevent abrasive removal of polymer from the gravel particles during transport, which fluid automatically exhibits a significant reduction in viscosity after the resin coated granular material has been placed in the zone where the consolidated mass is to be formed.

The present invention is directed to a novel fluid composition and methods employing this fluid whereby the above mentioned unfulfilled need and objective may be satisfied. The invention is directed toward formulating of a fluid which exhibits sufficient viscosity that it permits transportation of the resin coated gravel into the zone where the permeable mass is to be formed, after which the fluid viscosity is automatically reduced to a significant extent, permitting the resin coated sand grains to come together so they may form a uniform and continuous resin matrix bonding the sand or gravel particles together.

SUMMARY OF THE INVENTION

Applicants' invention pertains to fluid compositions and methods employing these fluid compositions whereby resin coated sand may be suspended in a viscous carrier fluid which prevents or reduces abrasive removal of resin from the sand or gravel during the time it is mixed on the surface of the earth and introduced into a subterranean zone where a permeable consolidated mass is to be formed. The fluid exhibits sufficient viscosity to protect the resin coated sand or gravel. The fluid contains an acid forming substance, such as an acid anhydride which reacts slowly with the water component of the carrier fluid causing a reduction in pH of the fluid. The viscosifying material is a mixture of hydroxyethylcellulose and a viscosity increasing additive which is a fluorescent dye. The presence of fluorescence dye increases the viscosity of the fluid containing hydroxyethylcellulose significantly, but the effect is eliminated entirely when the pH drops to a value of about 5 or less. A particularly preferred material for reducing the pH in the time desired, which is from two to four hours after mixing, is a slow reacting acid anhydride such as phthalic anhydride. Any other acid forming compound may be utilized, and the time for pH loss and hence viscosity reduction can be controlled by the choice of anhydride. Succinic anhydride is somewhat faster than phthalic anhydride. Higher molecular weight acyl halides may also be used. The concentration of acid anhydride should ordinarily be in the range of $1.5 \times 10^{-3}$ to $4 \times 10^{-3}$ and preferably $1.5 \times 10^{-3}$ to $2 \times 10^{-3}$ percent by weight. A preferred fluid for our purpose would contain from 0.17 to 0.22 percent by weight hydroxyethylcellulose, from 0.09 to 0.11 percent by weight fluorescent dye and from $1.5 \times 10^{-3}$ to $2 \times 10^{-3}$ percent by weight of phthalic anhydride or other acid anhydride.

DESCRIPTION OF THE PREFERRED EMBODIMENTS

Our invention is concerned with a fluid which contains a polymer to increase the fluid viscosity sufficiently to permit pumping a suspension of resin coated sand or gravel or other mineral particles in the fluid through an injection string located in a production wellbore without loss of significant amounts of resin from the surface of the resin coated particles. This fluid and the methods described herein may be utilized in connection with any type of resin coated fluid, but it is contemplated that it is especially suitable for use in connection with a sand control method employing the resin coated gravel described in our co-pending application 07/135,162 filed Dec. 18, 1987, the disclosure of which is incorporated herein by reference. In that disclosure a technique is described for coating sand or gravel with furfuryl alcohol which has been first mixed with an internal catalyst such as orthonitrobenzoic acid and a suitable solvent, preferably butyl acetate which assist in the subsequent polymerization reaction. These resin coated particles are suspended in an aqueous medium which contains sodium chloride, preferably saturated with sodium chloride. The sodium chloride carrier fluid also contains a viscosifying amount of a suitable hydrophilic polymer, and our preferred polymer is hydroxyethylcellulose, a non-ionic ether of cellulose which is soluble in hot or cold water, but insoluble in organic solvents. It is stable in concentrated salt solutions and nontoxic. The material may be obtained under the commercial name of NATROSOL ® available from Hercules, Inc. from Wilmington, Del. The especially preferred product is NATROSOL ® 250HHR. The 250 designation on this trademark indicates a hydroxyethyl molar substitution ratio of 2.5 and the HHR is an indication of the viscosity type.

This fluid requires that the viscosity enhancing effect of the polymer be enhanced by incorporation of a fluorescent dye or other optical brightener in the fluid. For reasons that are not entirely understood, the viscosity of the solution of hydroxyethylcellulose is increased significantly if the fluid also contains a small amount of fluorescent dye material. Commercial products suitable for this purpose include UNITEX RSB or TINOPAL CVS by Ciba-Geigy Corporation of Ardsley, N.Y. TINOPAL CVS is a distyryl biphenyl derivative, specifically 2,2'-1,1'-biphenyl-4,4,-diyldi-2,1-ethenediyl bis-benzenesulfonic acid, disodium salt. These particular dyes are anionic and have a solubility in distilled water of $25^x$ g/l at 25° C., and 300 g/l at 95° C. These and other commercially available fluorescent dyes increase the viscosity of solutions of hydroxyethylcellulose by a substantial degree, especially if the fluid pH is carefully controlled to the range of from 6 to 8. Another useful dye material which applicants have found to be suitable for this purpose is marketed under the trademark BLANCOPHOR SV by BASF-Wyandotte.

A fluid suitable for use as the viscous carrier fluid of our invention comprises water having dissolved therein from 0.2 to 1 percent by weight of hydroxyethylcellulose and from 0.8 to 1.2 percent by weight fluorescent dye. Persons skilled in the art of using such fluids will of course recognize that more polymer is required to produce the necessary viscosity at relatively higher temperatures, and so adjustments either within or beyond the above range may be necessary. The objective of incorporating the viscosifying amount of hydrophilic polymer in the carrier fluid of our invention is to support the resin coated particles and to ensure that the minimum abrasive removal of resin from the gravel particles occurs during the time the fluids are mixed and pumped down the injection string of the producing well during their placement in the formation adjacent to perforations of the producing well.

The above described aqueous fluid containing hydroxyethylcellulose and the fluorescent dye exhibits a most unique viscosity response to changes in pH, and it is this unusual response that is utilized to achieve the desired viscosity change of the fluid of the present invention. The viscosity of an aqueous fluid containing the above described amounts of hydroxyethylcellulose and fluorescent dye is in the range of 200 to 400 centipoise at the original pH, which is usually from 6 to 8, but decrease viscosity as the pH falls to values less than 6 is very dramatic, as can be seen in the experimental section below.

It is desired that the pH reducing additive which causes the reduction in viscosity at the appropriate time after the resin coated fluid has been pumped through the producing well and placed in the producing formation, cause the pH of the fluid to drop from a value in the range of from 6 to 8 to a value of 5 or less, which is sufficient to cause the sharp reduction in fluid viscosity desired for this particular application. Ordinarily, the amount of time required to pump the slurry comprising the aqueous carrier medium in the resin coated particles down the production well and locate them in the desired position adjacent to the perforation for the producing well is in the range of from one to four hours, and usually around two to three hours. Accordingly, the pH reducing additive should be one which will react slowly to form an acid, thereby reducing the pH in a time interval in the range of two or 3 hours, such that after the fluid with the suspended resin coated particles has been pumped into the desired location, the fluid viscosity will be reduced which permits the resin coated particles to settle closer together which is desired in order to form a dense strong permeable mass around the producing interval. Since the resin utilized in the above described procedure is acid catalyzed, the increase in pH in the aqueous fluid surrounding the resin coated particles will enhance the polymerization reaction, but only after the reaction of the additive has proceeded to the extent that the pH drops into the acidic range.

Any substance which reacts slowly with water to form acid may be utilized for the pH reduction necessary to cause drop in viscosity in order to achieve the desired effect in the fluid in the method of our invention. Acid anhydrides may be used for this purpose, although the anhydride chosen must be one which reacts sufficiently slowly that the pH reduction will not occur until after the carrier fluid containing the suspended resin coated particles has been placed in the well. Relatively low molecular weight acid anhydride such as acetic anhydride or propionic anhydride react much too quickly for our purpose. Higher molecular weight mono basic organic acid anhydrides can sometimes be used for this purpose. Polybasic acids, especially the high molecular weight anhydrides, such as succinic acid, glutaric acid or adipic acid may be used. Any polybasic acid having the following formula: HOOC-$(CH_2)_n$ COOH where n is from 3 to 7 may be reacted to form a cyclic anhydride which will be suitable for use in the process of our invention.

An especially preferred anhydride for use in our process are the cyclic anhydrides of dicarbyoxylic aromatic acids. In particular, the cyclic anhydride of orthophthalic acid is the especially preferred anhydride. Since phthalic anhydride is relatively insoluble, even the low concentrations required in our application may involve some undissolved, dispersed phthalic anhydride. As the material hydrolyzes to form an acid, the undissolved anhydride will be dissolved in the aqueous fluid and so all of the phthalic anhydride will eventually be utilized after the fluid has been formulated and pumped into the location where the permeable mass is desired to be formed. We have found that the desired change in pH will be achieved if the concentration of the acid forming material, specifically, our preferred embodiment, phthalic anhydride is from $1.0 \times 10^{-3}$ to $4.0 \times 10^{-3}$ and preferably $1.5 \times 10^{-3}$ to $2 \times 10^{-3}$ percent based on the total weight of the fluid.

EXPERIMENTAL

For purpose of demonstrating the operability of our process and the results obtained by its use, the following laboratory tests have been performed.

The following method was used to test whether the addition of a small amount of polymer would reduce the abrasive removal of resin from coated sand. A 50 g aliquot of <40 mesh coated sand was placed in an Osterizer blender with 300 g of water. The sample was then mixed at "beat" speed for 5 minutes. The sample was then rinsed, sieved, dried, and weighed. This procedure was repeated 3 times by placing the water with 300 g of each of the following:[(1)] 0.2% hydroxyethylcellulose (HEC) solution [Hercule's NATROSOL® 250], [(2)] 0.2% H.E.C. +0.1% dye [Geigy's UVITEX RSB], and (3) 0.3% H.E.C.+0.15% dye. The results are listed in Table 1.

TABLE 1

Abrasion Test Results

| Fluid | Viscosity | Weight Before Mixing | Weight After Mixing | % Lost |
|---|---|---|---|---|
| Water | 1.0 cps | 50.01 g | 47.02 g | 5.98 |
| (1) 0.2% H.E.C. | 30 cps | 50.00 g | 48.14 g | 3.72 |
| (2) 0.2% H.E.C. + Dye | 210 cps | 49.97 g | 48.44 g | 3.06 |
| (3) 0.3% H.E.C + Dye | 400 cps | 49.98 g | 48.02 g | 2.12 |

Samples of coated sand abraded in the kitchen blender with water could not be consolidated because no coating remained. Samples where the 5 minute abrasion test was made using the 0.3 H.E.C. with dye were consolidated along with samples which had never been abraded. The former broke on an average compression of 585 psi, while the latter withstood 1409 psi. In other words, the polymer mix alone succeeded in retaining 42% of the strength of an unabraded sample.

An experiment was conducted to demonstrate the variation in viscosity of a fluid comprising water, 0.2% hydroxyethylcellulose, 0.1% dye and 3% salt. The pH of the solution was reduced in 0.5 pH unit increments with phosphoric acid and the viscosities were measured. The results are shown in Table II below:

TABLE II

| Run | Fluid pH | Viscosity, Cps. |
|---|---|---|
| 12 | pH 6 | 186.0 |
| 13 | pH 5.5 | 11.0 |
| 14 | pH 5.0 | 8.0 |
| 15 | pH 4.5 | 9.5 |
| 16 | pH 4.0 | 9.0 |

PILOT FIELD EXAMPLE

A producing well is completed in a subterranean petroleum containing formation from 8,520 to 8,588 feet in depth. Considerable sand has been produced along with the oil from this formation, and so it is known that a significant cavity has been produced around the perforations of the producing well. The well must be shut down periodically to remove the sand, and the frequency of such shut-in period is increasing as a consequence of the increasing rate of production of sand from the formation. In order to reduce the necessity for periodically shutting in the well and to avoid the possible risk of collapse of the formation around the producing well which might destroy the well, it is decided to form a consolidated gravel pack just outside the perforations of the producing well for the purpose of stabilizing the formation and restraining the flow of formation sand into the well while permitting free flow of formation fluids including petroleum from the formation. Based on the volume of sand that has been produced since the well has first been completed, it is estimated that the average diameter of the void space around the well is about 2 feet from the outer perforations of the producing well. Accordingly, the volume of washed-out zone in the formation to be treated around this well, whose outside casing diameter is 10 inches, is given below:

$$(3.14)(2)^2(68) - (3.14)(10/12)^2(68) = 705 \text{ cu.ft.}$$

In order to adequately fill the above described cavity, a total of 705 cubic feet of resin coated gravel must be positioned in the formation. In order to accomplish this, a total of 26 cubic yards of gravel having an average particle size of 30 mesh is obtained, washed and dried. Several mixing tanks are positioned on the surface along with a 3 cubic yard concrete mixer which is utilized in the step of coating the sand grains with the resin. The resin employed in this procedure is Q01300 obtained from QO Chemicals Company. This is an oligomer of furfuryl alcohol, which applicants have found to be especially suitable in sand control processes where it is desired to form resin-coated gravel, position the resin coated gravel in the formation, and then cause polymerization of the resin to bond the gravel particles together. In order to properly coat the 705 cubic feet of gravel employed in this process, a total of 18,330 pounds of resin are required.

A first batch comprising 2,400 Gallons of the resin solution is formulated by mixing 1,833 gallons of the above described resin with 667 gallons of butyl acetate saturated with nitrobenzoic acid. The resin solution is prepared by first saturating the ester with nitrobenzoic acid and then mixing four parts of resin to this fluid mixture.

The gravel particles are then mixed with the resin solution in the ratio of 1 part by volume resin mixture to 10 parts by volume sand. Mixing required about 2–5 minutes per batch in order to ensure complete coating of the sand grains with the resin, after which each batch of resin coated sand is added to a tank containing saturated salt water which also contain 0.8 percent by weight hydroxyethylcellulose and 0.1 percent by weight fluorescent dye which provides the needed viscosity for placement of the resin coated sand grains in the formation. To this aqueous carrier fluid is added 0.8 percent by weight of phthalic anhydride, which will cause the pH of the carrier fluid to drop significantly after several hours, which produces the reduction in viscosity desired after the resin coated sand grains have been positioned in the formation adjacent to the production well. The phthalic anhydride is added to the slurry immediately before the material is pumped into the well, so there will be no chance that the pH drop will occur before the suspension of resin coated sand in the viscous carrier fluid has reached the desired location, which might cause the sand particles to settle out within the injection string, and cause serious problems in the placement of the material in the well. This mixture, comprising the saturated salt carrier fluid containing phthalic anhydride and the suspended resin coated gravel are then pumped down a tubing string located in the producing well. The fluid mixture passes out through the perforations and into the washed-out cavity in the formation.

The above procedure is continued on a batch process due to the limitations of the mixer volume until the total desired amount of resin coated gravel has been formed, suspended in the viscosified brine carrier fluid containing phthalic anhydride and injected into the well where the particles pass through the perforations and form a filter cake on the formation face, gradually filling up the washed-out cavity. During and immediately after the period when the particles are being packed in the washed out cavity is when it is desired for the viscosity of the carrier fluid to reduce as a consequence of reaction of phthalic anhydride with the water component of the aqueous carrier fluid, reducing the pH and causing a significant reduction in the viscosity of the suspending fluid. Less than one day is required for forming the resin-coated gravel and injecting the same into the formation. Since the resin coated sand and gravel are prepared in batches and suspended in the viscosified carrier fluid, the time for pumping each batch of carrier fluid and coated gravel into the formation is only about 1.6 hours. After the last batch of coated gravel has been injected, the well is shut-in for a period of seven days, which is more than sufficient for the resin material to polymerize, binding the sand grains together while still maintaining sufficient fluid permeability to allow passage of fluid there through.

Although our invention has been described in terms of a series of specific preferred embodiments and illustrative examples which Applicants believe to include the best mode for applying their invention known to applicants at the time of this application, it will be recognized to those skilled in the art that various changes may be made in the composition and methods described herein without departing from the true spirit and scope of our invention which is defined more precisely in the claims appended immediately hereinafter below.

We claim:

1. In a method for forming a consolidated gravel pack in a washed out cavity adjacent to a producing well penetrating a subterranean oil formation comprising the steps of suspending resin coated gravel in a viscous aqueous carrier fluid and pumping the gravel into the portion of the formation where it is desired to form the consolidated gravel pack, said gravel particles being suspended in an viscous aqueous fluid containing hydroxyethylcellulose and a fluorescent dye and having an initial pH in the range of from 6 to 8, wherein the improvement comprises incorporating in the viscous aqueous carrier fluid an acid anhydride which reacts with the water component of the aqueous carrier fluid to form an acid, reducing the pH of the fluid to a value less than about 6 in from 2 to 6 hours which causes the viscosity of the aqueous carrier fluid to be reduced, thereby permitting the resin coated sand particles to come into close contact in order to form a dense permeable gravel pack.

2. A method as recited in claim 1 wherein the acid anhydride has the formula $HOOC-(CH_2)_n COOH$ where n is from 3 to 7.

3. A method as recited in claim 2 wherein the acid anhydride is succinic anhydride.

4. A method as recited in claim 2 wherein the acid anhydride is glutaric anhydride.

5. A method as recited in claim 1 wherein the acid anhydride is phthalic anhydride.

6. A method as recited in claim 1 wherein the concentration of acid anhydride is from $1 \times 10^{-3}$ to $4 \times 10^{-3}$ percent by weight.

7. A method as recited in claim 1 wherein the concentration of acid anhydride is from $1.5 \times 10^{-3}$ to $2 \times 10^{-3}$ percent by weight.

8. A method as recited in claim 1 wherein the carrier fluid also contains sodium chloride.

9. A method as recited in claim 8 wherein the carrier fluid is saturated with sodium chloride.

* * * * *